Oct. 18, 1932.  J. J. GREBE  1,882,809
COMPOSITION OF MATTER
Filed Feb. 21, 1929
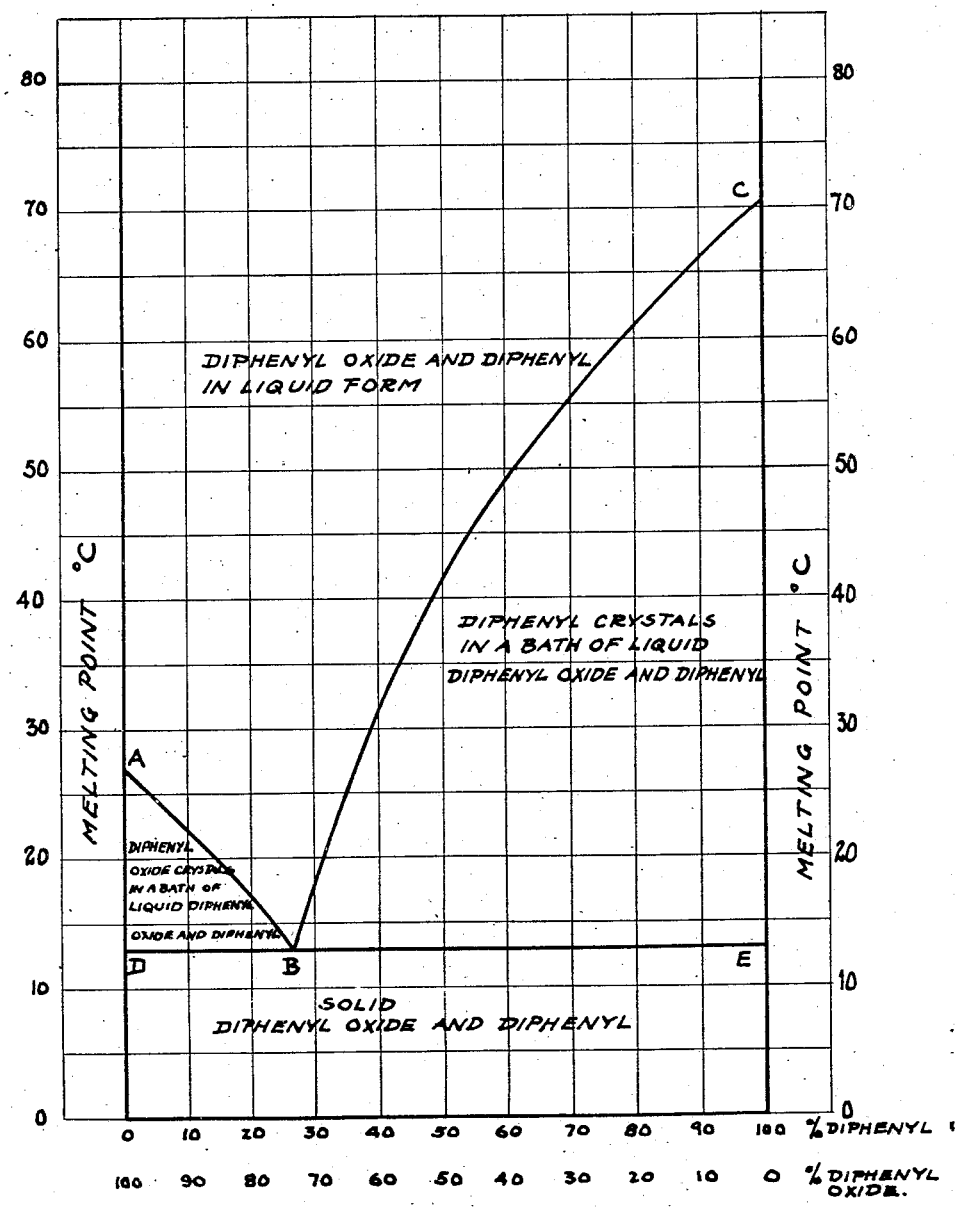
INVENTOR.
John J. Grebe
BY
Fay, Oberlin & Fay
ATTORNEYS.

Patented Oct. 18, 1932

1,882,809

UNITED STATES PATENT OFFICE

JOHN J. GREBE, OF MIDLAND, MICHIGAN, ASSIGNOR TO THE DOW CHEMICAL COMPANY, OF MIDLAND, MICHIGAN, A CORPORATION OF MICHIGAN

COMPOSITION OF MATTER

Application filed February 21, 1929. Serial No. 341,700.

In power plants and miscellaneous heat transfer apparatus ordinarily steam and water are used, although fluids of high boiling point would, in many cases, be more advantageous. Some such fluids which are desirable in many respects have been found to exhibit under certain conditions of usage tendencies with respect to change of physical state not favorable to the particular use in view. It is accordingly among the objects of the present invention to provide a mixed fluid for such usages having tendencies to change of physical state favorably modified from those of either of its components. Other objects and advantages will appear as the description proceeds.

To the accomplishment of the foregoing and related ends, the invention, then, consists of the features hereinafter fully described and particularly pointed out in the claims, the annexed drawing and the following description setting forth in detail but one of the various ways in which the principle of the invention may be used.

Where a substance of high boiling point is employed as the heat energy transfer medium in a system in which part is liable to have its temperature reduced to a relatively low point, for instance, 80° C. or less or where the entire system is at times subject to such a temperature reduction the tendency of the high boiling medium to then solidify may be an objection.

In accordance with the present invention I provide an effective heat energy transfer media available for an extended range by compounding two high boiling materials, specifically diphenyloxide $(C_6H_5)_2O$ and diphenyl $(C_6H_5)_2$.

In said annexed drawing:

The single figure there appearing is a diagrammatic representation of certain physical properties of the above noted mixed fluid.

In such diagrammatic figure the physical property represented, it will be noted, is the freezing point range for various mixtures of diphenyloxide and diphenyl. While the curves of the diagram are not necessarily accurate representations throughout of the exact manner in which the freezing point varies, they do represent in approximate manner the way that this characteristic property varies throughout the range under consideration.

Referring more particularly to the drawing, the area above the curve ABC represents the physical state of the diphenyloxide-diphenyl mixture wherein both components are fluid. In like manner the area below line ABC and above DBE represents a state where crystals of one component will exist in a fluid menstruum of both materials. If the diphenyl percentage in the mixture is less than 26½, diphenyloxide crystals will be present, while if the diphenyl percentage is greater than 26½, diphenyl crystals will be present. The area below DBE represents the solid state for all mixtures of these two materials.

As a specific example of the above, taking a mixture of 90 per cent diphenyloxide, 10 per cent diphenyl, the mixed fluid can be cooled to a temperature of approximately 22° C. at which point further cooling will result in crystals of diphenyloxide forming. These diphenyloxide crystals will continue to form as the temperature is lowered, until a temperature of approximately 13° C. is reached, at which time the crystals will be suspended in a bath of eutectic mixture having the composition shown at B, namely 26½ per cent diphenyl and 73½ per cent diphenyl oxide. Further abstraction of heat from the fluid will result in the mixture completely freezing at the last-mentioned temperature.

In similar manner, if the diphenyl exceeds 26½%, cooling from the liquid phase will result first in the formation of diphenyl crystals, which will continue to come out until temperature of the bath reaches 13° C., at which point on further cooling the remaining liquid which will be of eutectic composition will completely solidify.

From the above it is to be noted that with any mixture of diphenyloxide and diphenyl, the initial freezing point will be less than that of the diphenyl. Likewise any mixture of the two, wherein the diphenyl does not exceed 37% of the total will have an initial freezing point equal to or lower than that of the diphenyloxide. This range of composition wherein the initial freezing point of the mixture is below that of the diphenyloxide is the desirable range. However, of the mixtures falling within this range the eutectic mixture which has the lowest freezing point is to be, in general, preferred. This mixed fluid, which is relatively stable at temperatures of 400° C. and below is very satisfactory for heat transfer purposes, among which its use for chemical processes, generating power, indirect heating and reheating are among the most important.

To reduce the decomposition of this mixed fluid to a minimum the two materials used should be of a relatively high state of purity. When using materials of this purity there seems to be very little decomposition difficulty under normal conditions of use. However, after using the fluid continuously for some time, a gradual decomposition will occur wherein products of higher and lower boiling point will be formed. The formation of such decomposition products still further lowers the final freezing point of the mixture and for some uses may be desirable. This decomposition, however, does not interfere to any extent with the efficiency of the fluid as a heat transfer material. However, if the material does become appreciably decomposed it can be either discarded or can be passed through a distillation process whereby the lower boiling fractions will be given off first and can be discarded while the higher boiling fraction will be left behind at the completion of the distillation step and can be thrown away at that time.

This mixed fluid which has a boiling point of from 235° to 260° C., is admirably suited for a power fluid due to its relatively high boiling point. At the same time such temperature is low enough to allow satisfactory pressures to be maintained and still be within the temperature limit of commercially usable apparatus. For instance vapor generated from this mixed fluid at 100 pounds gauge will have a temperature of approximately 350° to 380° C. When using such vapor to generate power, it is passed to an energy abstracting mechanism or prime mover where a portion of its heat is given up and the fluid is finally returned to the vapor generator as liquid in manner well known to the art.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A composition of matter, which comprises diphenyloxide and a substantial amount of diphenyl.

2. A composition of matter, which comprises diphenyloxide together with a smaller but substantial amount of diphenyl.

3. A composition of matter, which comprises diphenyloxide about 73½% and diphenyl about 26½%.

4. A composition of matter suitable for heat transfer purposes over an extended range of temperature comprising diphenyl oxide having admixed therewith a smaller but substantial amount of diphenyl to lower the melting point while maintaining the boiling point substantially unchanged.

5. A heat transfer medium which comprises a mixture of diphenyloxide and a substantial amount of diphenyl.

6. A heat transfer medium which comprises diphenyloxide with as high as 37 per cent diphenyl admixed therewith.

7. A heat transfer medium comprising the eutectic mixture of diphenyloxide and diphenyl.

Signed by me this 14th day of February, 1929.

JOHN J. GREBE.